Patented Jan. 9, 1945

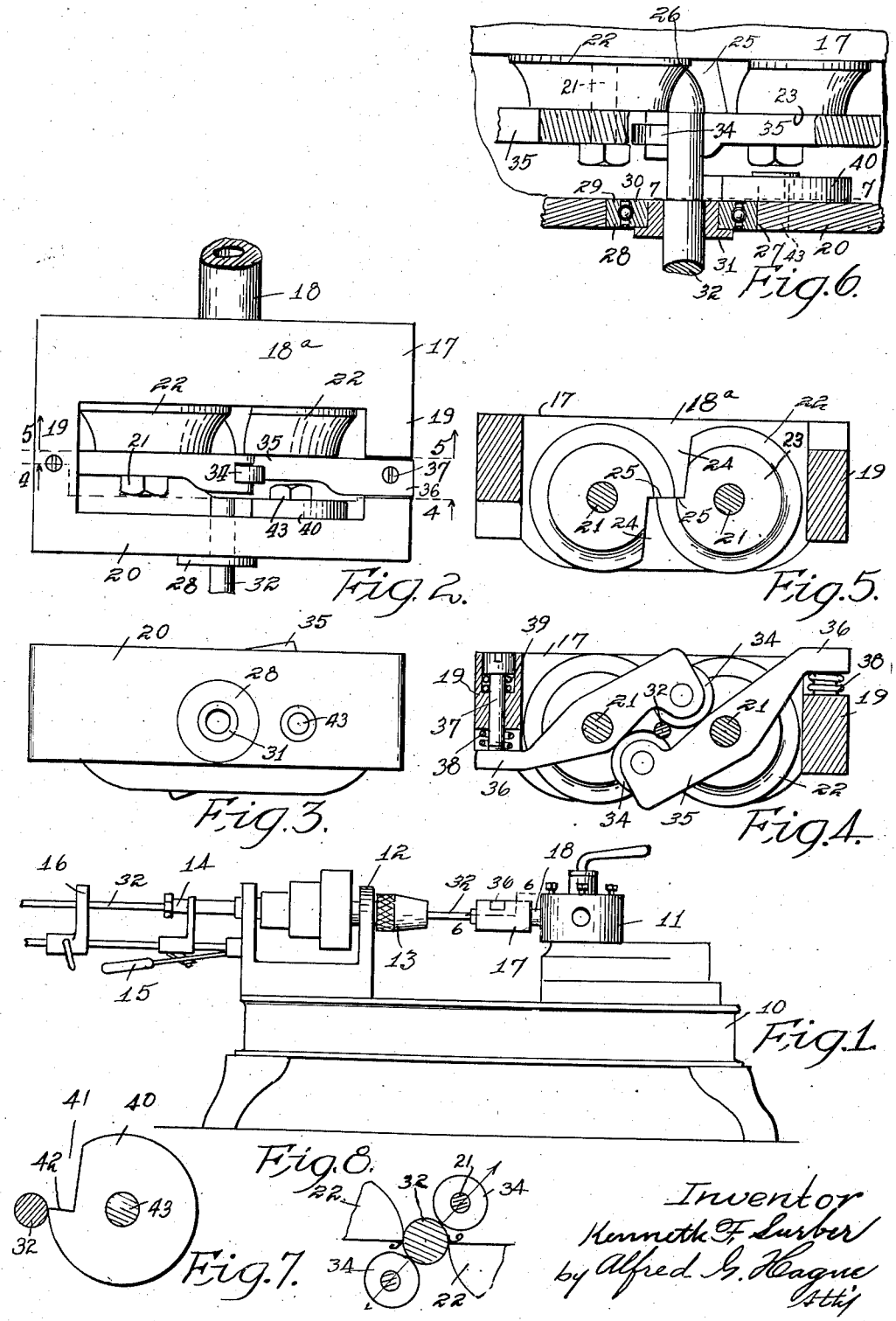

2,366,810

UNITED STATES PATENT OFFICE 2,366,810

TOOL AND HOLDER FOR TURRET LATHES, SCREW MACHINES, AND THE LIKE

Kenneth F. Surber, Des Moines, Iowa, assignor of one-half to Don L. Miller, Des Moines, Iowa Application February 8, 1943, Serial No. 475,148

3 Claims. (Cl. 82—2)

This invention relates to improvements in tool holders for turret lathes and automatic screw machines.

The object of my invention is to provide an improved tool holder so constructed and arranged that a pair of circular formed tools may be supported therein in such a manner that an article such as a rifle bullet may have its tapered end formed rapidly and more uniformly than has heretofore been possible by the ordinary method of using a single cutting tool, with the cutting edges of the tools arranged diametrically opposite each other so that cutting takes place on opposite sides of the stock to counterbalance or stabilize any tendency of the stock to move away from the tool, and in connection therewith an improved tool rest to further steady the tendency of the tool to move off in a lateral direction at an angle to the cutting face of the tools.

A further object of my invention is to provide in a tool holder having what is commonly called a spindle opening for receiving rotatable and longitudinally movable stock which usually employs a renewable bushing, improved means for mounting the bushing to prevent excessive wear.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of a screw machine showing the manner in which my improved tool holder is applied thereto;

Figure 2 is a plan view of the tool holder;

Figure 3 is an end elevation of the same;

Figure 4 is a detail sectional view taken on the line 4—4 of Figure 2;

Figure 5 is a detail sectional view taken on the line 5—5 of Figure 2;

Figure 6 is a detail sectional view taken on the line 6—6 of Figure 1;

Figure 7 is a detail sectional view taken on the line 7—7 of Figure 6, and

Figure 8 is a diagrammatical view illustrating the manner in which the cutting strains of the two cutters counteract each other.

In the drawing I have used the reference numeral 10 to indicate the lathe bed of a hand-operated screw machine employing a turret head 11 and the ordinary tail stock 12 having a stock-operating clutch 13 and the ordinary feed mechanism 14 which is operated by the hand lever 15, the usual stock support 16 also being included.

My improved tool holder comprises a box frame 17 having a shank 18 by means of which the frame 17 may be supported in the turret head 11. The frame 17 includes a heavy head portion 18a, side members 19 and a front member 20. Mounted in the member 18a is a pair of shafts 21, each of which is designed to support a circularly formed tool 22, said tools having substantially the form of a truncated cone having their bases mounted adjacent to the member 18a with their truncated portions 23 facing inwardly, the peripheral surface of the said cones being preferably concaved, as clearly illustrated in Figure 2, the periphery of said cutters also being provided with notches 24 to form cutting surfaces 25, the shafts 21 being spaced apart such a distance that the outer ends of the cutters 22 thus formed will be slightly overlapped, as illustrated in Figure 6 at the point 26.

The front member 20 is provided with an opening 27 which is in a common horizontal plane with the shafts 21 and in a plane perpendicular thereto midway between said shafts. Supported within the opening 27 is a ball bearing 28 having its outer race 29 fixed in said opening 27 and its inner race 30 provided with a sleeve 31, said sleeve being detachably mounted therein. The opening of said sleeve is adapted to guide the stock 32 to operative positions in relation to the cutters with the axis of rotation of said stock intersecting the overlapping portions at point 26 of said cutters in such a manner that if the stock 32 is rapidly rotated by the clutch 13 and fed longitudinally toward the cutters 22, the end of the stock will be engaged by both cutters and shavings taken from opposite sides of the stock, and as the stock is further fed into the cutters the end of the stock will be tapered to the proper size and curvature, as illustrated in Figure 6, which might be that of any desired form of a rifle bullet. As the stock is rotated between the two cutters, any tendency of the stock to move laterally from the cutting edge of one of the cutters will, of course, tend to move the stock into further engagement with the opposite cutter, so that this tendency to move away from the cutters is counterbalanced by the cutters. However, as the torque is applied to the stock there is a tendency for the stock to move laterally in a plane at an angle to the plane of the cutting faces of the tools, as indicated by the arrows in Figure 8. To overcome this tendency, I have provided rollers 34 supported by levers 35, said levers being pivotally mounted on the shafts 21 and having outwardly extending arms 36 in which are mounted adjusting screws 37, said screws each having a coil spring 38 mounted thereon between the lever arm 36 and the frame members 19 for automatically moving the rollers 34 away from the stock. Carried on the screws 37 beneath the heads thereof are springs 39 providing a slight amount of yieldable pressure to said rollers and the stock on which they are mounted as the tension of the screw 37 is increased to take care of any slight variations in the diameter of the stock. By this arrangement it will be seen that the oppositely arranged cutters will eliminate any tendency of the stock to move away from the cutters as the cutting action takes place, and the rollers 34 will support the stock against any tendency to climb away from the cutters due to the resultant force of the torque and the resistance offered by the cutters.

Adjacent to the inner face of the member 20 I have provided a blanking cutter 40, which is also of circular form, having a notch 41 in the cutting surface 42, this cutter being supported on a pivot 43 adjacent to the sleeve 31 so that the tendency of the stock to move away from said cutter will be carried by said sleeve 31. By mounting the sleeve 31 in the anti-friction bearing I have provided means against excessive wear in the sleeve 1, due to the fact that the sleeve will be permitted to rotate with the stock, and the only perceptible wear on the sleeve will be that caused by the longitudinal movement between the stock and said sleeve, which is small compared to the wear caused by the rotation of the stock in the sleeve in the ordinary construction.

The bearing 28 may be either of the ball or roller type, having the bearings preferably sealed against dust entering the same.

Thus, it will be seen I have provided an improved tool support wherein patterned articles usch as rifle bullets and the like which are formed of very hard material may be rapidly and accurately formed with a minimum amount of vibration of the stock relative to the cutters, wherein the stock is fed endwise in operative relation with the cutting tools and separated from one end only and wherein the excessive wear of the feed bushing has been greatly reduced, the elimination of said wear also contributing to the stability of the cutter at the time the cutting operation takes place.

I claim as my invention:

1. In a device of the class described, a supporting frame, a pair of substantially truncated circularly formed cutting tools supported in a common plane, the peripheries of said cutters being oppositely notched and provided with radial cutting faces, said cutting faces being in a common plane and slightly overlapping each other at one point, means for feeding one end of a rotating rod of stock material longitudinally toward the truncated ends of said cutters with the axis of rotation of said rod perpendicular to the plane of said cutters and intercepting the intersection of said overlapping portions of said cutters, a pair of oppositely supported tool rest rollers engaging said stock near said cutters to hold the stock against lateral movement in a plane resulting from the rotation of said stock and the resistance offered by the cutters, and means for yieldably adjusting the pressure applied to said rollers.

2. In a device of the class described, a supporting frame having a shank projecting from one end thereof, a rotatable stock guide at the opposite end of said frame in coaxial alignment with said shank, said frame having an opening therein intermediate said two ends, a pair of cutting tools supported on said frame and located within said opening, said cutting tools being supported opposite each other, means for feeding one end of a rotating rod of stock through said stock guide and between said cutters, a pair of stock-contacting rollers oppositely supported on said frame within said opening to hold the stock against lateral movement, and means for yieldably revolving and maintaining said rollers in contact with said stock.

3. In a device of the class described a frame with an opening therethrough, a shank extended outwardly from one side wall of said opening, a rotatable stock guide in an opposite side wall of said opening, a cutter supported on said frame within said opening, means for rotating and longitudinally feeding one end of a rod of stock through said stock guide to said cutter, means for holding said stock against lateral movement during a cutting operation including a pair of rollers for contacting opposite sides of said stock, a pair of pivoted arms pivotally supported on said frame and pivotally movable within said opening, means rotatably supporting a roller on a corresponding arm, and a pair of adjustable yieldable means oppositely carried on the end walls of said opening and operatively associated with a corresponding pivoted arm to bias a corresponding roller into contacting engagement with said stock.

KENNETH F. SURBER.